United States Patent
Nau

(10) Patent No.: US 9,309,813 B2
(45) Date of Patent: Apr. 12, 2016

(54) REGULATING DEVICE FOR AN ACTUATOR

(75) Inventor: Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 536 days.

(21) Appl. No.: 13/261,280

(22) PCT Filed: Sep. 14, 2010

(86) PCT No.: PCT/EP2010/063440
§ 371 (c)(1),
(2), (4) Date: May 22, 2012

(87) PCT Pub. No.: WO2011/051047
PCT Pub. Date: May 5, 2011

(65) Prior Publication Data
US 2012/0222504 A1    Sep. 6, 2012

(30) Foreign Application Priority Data

Oct. 30, 2009 (DE) .......................... 10 2009 046 209

(51) Int. Cl.
| | | |
|---|---|---|
| *F02D 9/06* | (2006.01) | |
| *F02D 9/10* | (2006.01) | |
| *F16K 31/04* | (2006.01) | |

(52) U.S. Cl.
CPC ................ *F02D 9/06* (2013.01); *F02D 9/1065* (2013.01); *F16K 31/045* (2013.01); *Y10T 74/18184* (2015.01); *Y10T 74/19651* (2015.01)

(58) Field of Classification Search
CPC ....... F16H 19/0659; F16H 19/00; F16H 1/20; F16H 1/206; F16H 1/24; F02D 9/06; F02D 9/1065
See application file for complete search history.

(56) References Cited

U.S. PATENT DOCUMENTS

| | | | |
|---|---|---|---|
| 3,973,449 A | 8/1976 | Berlinger, Jr. | |
| 2004/0105178 A1* | 6/2004 | Brouwer et al. | ............. 359/872 |
| 2009/0301824 A1 | 12/2009 | Dettenberger et al. | |

FOREIGN PATENT DOCUMENTS

| | | | |
|---|---|---|---|
| CN | 1494498 A | 5/2004 | |
| CN | 101400922 A | 4/2009 | |
| CN | 101537806 A | 9/2009 | |
| DE | 102008042947 A1 | 4/2010 | |
| EP | 1662120 A2 | * 5/2006 | |
| JP | 2004-522641 A | 7/2004 | |
| JP | 2006-274834 A | 10/2006 | |
| JP | 2009-529638 A | 8/2009 | |
| JP | 2009-226982 A | 10/2009 | |
| WO | 2007104505 A1 | 9/2007 | |

* cited by examiner

*Primary Examiner* — Lindsay Low
*Assistant Examiner* — Jacob Amick
(74) *Attorney, Agent, or Firm* — Maginot, Moore & Beck LLP

(57) ABSTRACT

The invention relates to a regulating device for an actuator arranged in a gas passageway of an internal combustion engine, in particular for a bypass flap arranged in an exhaust turbocharger, having an electrical servomotor, a regulating member coupled to the actuator and a multi-gear transmission arranged between the servomotor and regulating member. According to the invention, to achieve a large transmission ratio range with a small number of transmission gears, two transmission wheels interact in at least one of the transmission gears via an evoloid toothing.

5 Claims, 2 Drawing Sheets

REGULATING DEVICE FOR AN ACTUATOR

CROSS-REFERENCE TO RELATED APPLICATION

This application is a 35 USC 371 application of PCT/EP 2010/063440 filed on Sep. 14, 2010.

BACKGROUND OF THE INVENTION

1. Field of the Invention

The invention relates to a regulating device for an actuator disposed in a gas passageway of an internal combustion engine, in particular for a bypass flap disposed in an exhaust turbocharger.

2. Description of the Prior Art

A known regulating device for a bypass flap in the exhaust turbocharger of an internal combustion engine (German patent disclosure DE 10 2004 056 897 A1) has a multi-gear transmission, disposed between the electric servomotor and the regulating shaft, which has a transmission input gear, a nonlinear transmission output gear, and a transmission intermediate gear disposed between the transmission input and output gears.

ADVANTAGES AND SUMMARY OF THE INVENTION

The regulating device according to the invention, has the advantage that by the use of an evoloid toothing in at least one of the transmission gears of a multi-gear transmission that has a large gear ratio range, the number of transmission gears required can be reduced while keeping the desired maximum gear ratio unchanged. By means of the reduction in the number of transmission gears and of the slight axial spacing of the transmission wheels with evoloid toothing that mesh with one another, a compact design of the transmission is obtained. With the evoloid toothing, a large gear ratio can be achieved, and the evoloid toothed transmission wheels have great tooth root strength and thus contribute to the sturdiness of the transmission.

In an advantageous embodiment of the invention, a further transmission gear is embodied as a nonlinear transmission gear, which is preferably disposed between the transmission gear with evoloid toothing and the regulating shaft. With this kind of nonlinear transmission gear, in combination with the transmission gear with evoloid toothing, a very large gear ratio, for instance i=90, can be attained with only two transmission gears, so that a less-powerful and thus structurally smaller electric servomotor can be used in the regulating device. Because of the compact design of the transmission and the small servomotor, what is attained overall is a regulating device which requires only little installation space. Thus the regulating device of the invention is especially well suited for adjusting a bypass flap in exhaust turbochargers of internal combustion engines, since as a rule very little space is available in the drive train of the internal combustion engines. The compact design of the regulating device makes it possible to dispose the regulating device near the turbocharger, so that only a short lever mechanism is required for transmitting the pivoting motion of the regulating shaft to the bypass flap in the turbine housing of the turbocharger.

BRIEF DESCRIPTION OF THE DRAWINGS

In the ensuing description, the invention is described in further detail in terms of an exemplary embodiment shown in the drawings. In the drawings.

DESCRIPTION OF THE PREFERRED EMBODIMENT

Figure 3:
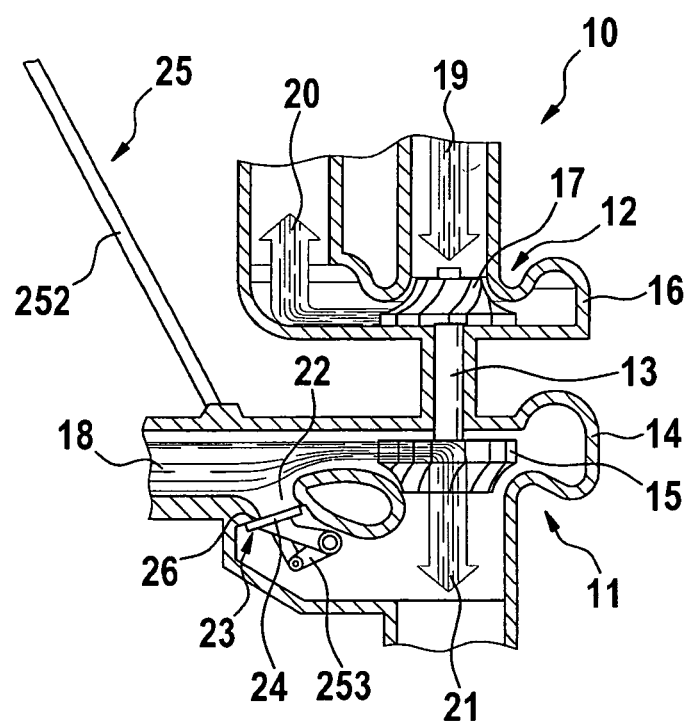
FIG. 3 is a schematic fragmentary view of the exhaust turbocharger in longitudinal section.

The regulating device shown in longitudinal section for an actuator that is disposed in a conduit carrying a gaseous medium, or gas passageway for short, of an internal combustion engine is preferably used for an exhaust turbocharger 10 of the kind shown schematically and in fragmentary form in FIG. 3. Alternatively, the regulating device can also serve to adjust a throttle valve in the air intake tract of the engine, or can serve as an actuator in an exhaust recirculation valve.

Exhaust turbochargers are known and are described for instance in the Bosch *Kraftfahrttechnisches Taschenbuch* [Automotive Handbook] ISBN-3-528-23876-3, pages 532 ff. The exhaust turbocharger 10 comprises two flow machines, a turbine 11 and a compressor 12, which are disposed on a common shaft 13. The turbine 11 has a turbine wheel 15, disposed in a turbine housing 14, and the compressor 12 has a compressor wheel 17, disposed on a compressor housing 16. The turbine wheel 15 is driven by the inflowing exhaust gas 18, and the compressor wheel 17 driven by the turbine wheel 15 aspirates fresh air 19 from the atmosphere and blows the compressed fresh air 20 into the combustion chambers of the internal combustion engine. The outflowing exhaust gas 21 leaving the turbine wheel 15 exits from the turbine housing 14.

In internal combustion engines, charge pressure regulation is provided, so that given the wide rpm spread, an appropriate torque design can be attained, in order that the maximum permissible charge pressure is adhered to. The desired charge pressure is attained by regulating the power of the turbine 11 on its exhaust-gas side. To that end, a bypass 22 is provided in the turbine housing 14, by way of which bypass some of the inflowing exhaust gas 18 is carried past the turbine wheel 15 and carried away directly with the outflowing gas 21. The bypass 22 is controlled by an actuator 23 in the form of a bypass flap 24. The actuator 23 or bypass flap 24 is actuated via a lever mechanism 25, of which a secondary lever 253 and part of a connecting lever 252 can be seen in FIG. 3.

Figure 1:
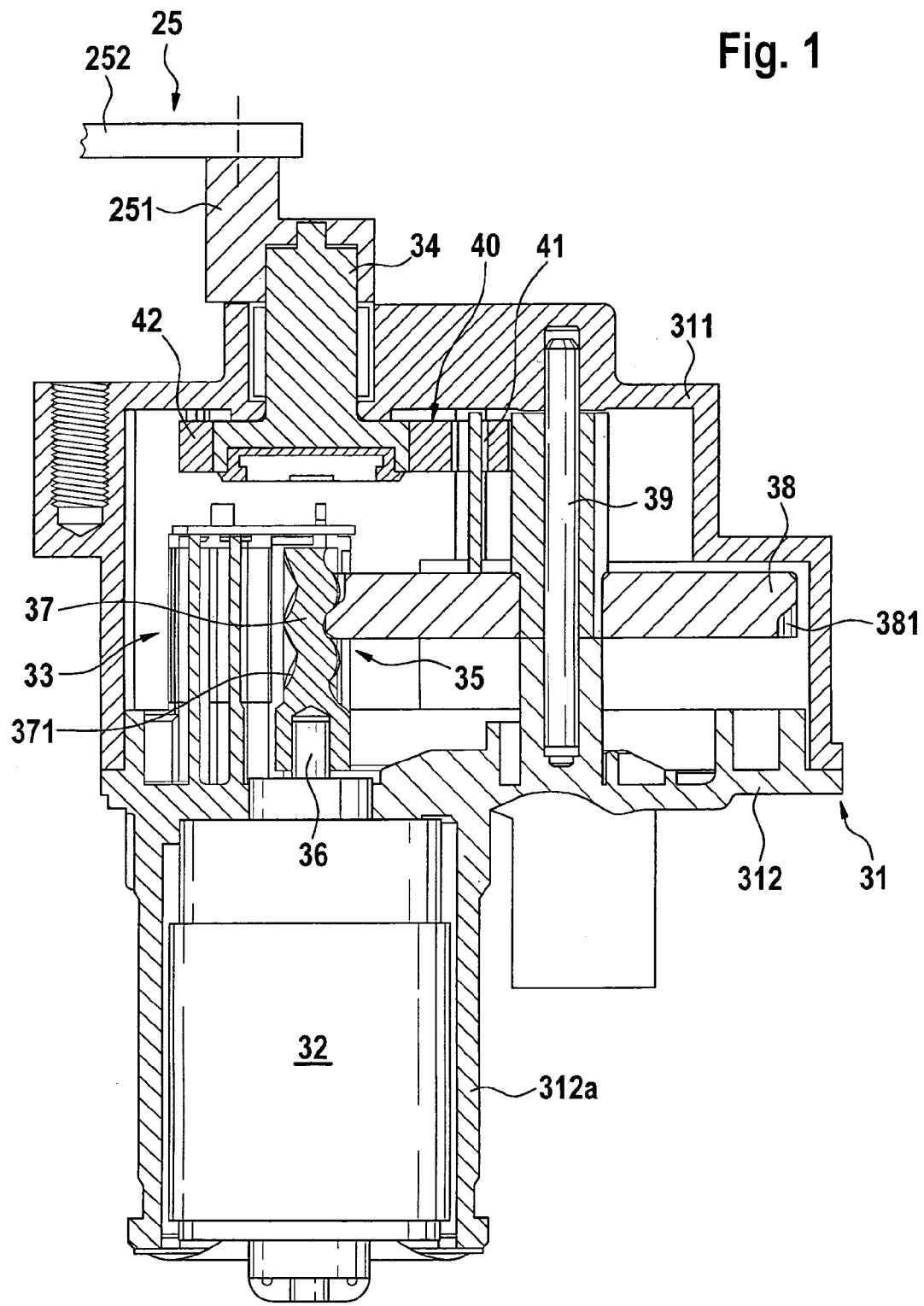
FIG. 1 is a longitudinal section through a regulating device with an electric servomotor and a mechanical transmission for an exhaust turbocharger of an internal combustion engine.

The regulating device shown in longitudinal section in FIG. 1 has a two-part actuator housing 31, which comprises a cup-shaped base body 311 and a cap 312 covering the base body 311. A hollow shaft 312a is formed integrally in one piece onto the cap 312, and an electric servomotor 32 with a driven shaft 36 protruding into the base body 311 is inserted into the hollow shaft. A two-gear transmission 33 is disposed in the base body 311, and by way of it the servomotor 32 drives a regulating shaft 34. The regulating shaft 34 protruding from the base body 311 is coupled with a primary lever 251 of the lever mechanism 25.

Figure 2:
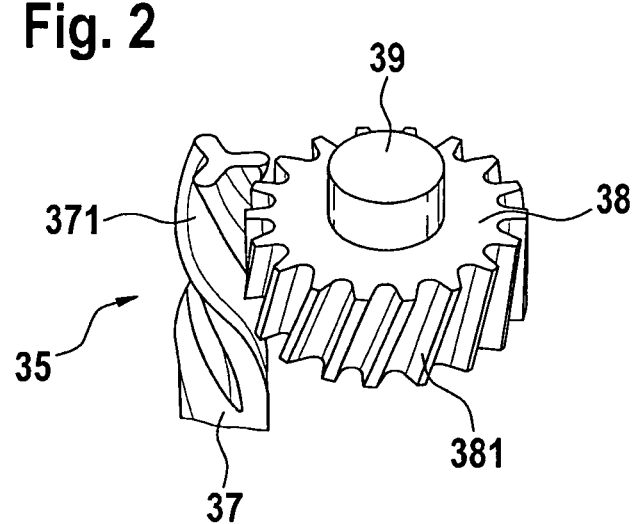
FIG. 2 is a fragmentary view in perspective of a transmission gear with evoloid toothing of the transmission of FIG. 1.

Of the two transmission gears, an transmission input gear 35 has two transmission wheels, cooperating via an evoloid toothing; one transmission wheel is a pinion 37 with evoloid teeth 371, which is seated in a manner fixed against relative rotation on the driven shaft 36 of the servomotor 32, and the other transmission wheel is a spur wheel 38, seated on a shaft 39 and having evoloid teeth 381 that are chamfered toward the wheel axis. In FIG. 2, the pinion 37 and the spur wheel 38 are shown in perspective. The pinion 37 has a maximum of three evoloid teeth 371, which are chamfered such that at all times, at least one evoloid tooth 371 is meshing with the evoloid teeth 381 on the spur wheel 38. To achieve a broader gear ratio range, an transmission output gear 40 disposed between the transmission input gear 35 and the regulating shaft 34 is embodied as a nonlinear transmission gear, which in turn acts upon the regulating shaft 34. The nonlinear transmission output gear 40 can for instance be embodied as shown and described in DE 10 2004 056 897 A1. It includes a drive segment 41, driven by the spur wheel of the transmission input gear 35, and a driven segment 42, coupled with the regulating shaft 34, which segment, with its external toothings, rolls on rolling curves whose rolling curve radii vary steadily over the range of rotation of the segments 41, 42.

Via the two transmission gears 35, 40, the rotation of the driven shaft 36 of the servomotor 32 is transmitted, with a very large gear ratio, to the regulating shaft 34, which pivots the primary lever 251 of the lever mechanism 25 within a pivoting range of approximately 40°, for example, and after maximum pivoting, the bypass 22 in the turbine housing 14 is closed. With the two transmission gears 35, 40, a very large gear ratio, such as i=90, can be implemented, so that for pivoting the regulating shaft 34, only a low-power, structurally small electric servomotor 32 is needed, which via the transmission gear ratio generates a sufficiently high torque that it presses the bypass flap 24 with a sealing fit against a stop 26, counter to the pressure of the inflowing exhaust gas 18, and when the bypass 22 is closed, the bypass flap 24 contacts this stop.

The foregoing relates to the preferred exemplary embodiment of the invention, it being understood that other variants and embodiments thereof are possible within the spirit and scope of the invention, the latter being defined by the appended claims.

The invention claimed is:

1. A regulating device for an actuator disposed in a gas passageway of an internal combustion engine and configured to regulate a bypass flap disposed in an exhaust turbocharger, comprising:

an electric servomotor;

a regulating shaft coupled to the actuator; and a multi-gear transmission disposed between the servomotor and the regulating shaft, the multi-gear transmission including only two transmission gear stages with at least one of the transmission gear stages including two transmission wheels that cooperate via an evoloid toothing, wherein one of the two transmission wheels is a pinion with evoloid teeth that is seated on a driven shaft of the servomotor in a manner fixed against relative rotation, and a second of the two transmission wheels is a rotatably supported spur wheel with evoloid teeth that are chamfered toward its axis, wherein the transmission gear stage with evoloid toothing forms an input transmission gear stage driven by the driven shaft of the servomotor, and wherein the other of the transmission gear stages is configured as a nonlinear further transmission gear stage that forms an output transmission gear stage that drives the regulating shaft.

2. The regulating device as defined by claim 1, wherein the number of evoloid teeth of the pinion is a maximum of three.

3. The regulating device as defined by claim 1, wherein the regulating shaft is coupled to the actuator via a lever mechanism.

4. The regulating device as defined by claim 2, wherein the regulating shaft is coupled to the actuator via a lever mechanism.

5. The regulating device as defined by claim 1, further comprising a two-part actuator housing having a base body and a cap closing the base body, wherein the multi-gear transmission is received in the base body with the regulating shaft protruding from the base body, and the servomotor is received in a hollow shaft, integrally formed onto the cap, with the servomotor driven shaft protruding from the hollow shaft.

* * * * *